United States Patent [19]
Yoshimura

[11] Patent Number: 5,672,270
[45] Date of Patent: Sep. 30, 1997

[54] APPARATUS FOR AEROBIC TREATMENT OF WASTE WATER

[75] Inventor: Toshiki Yoshimura, Saitama-ken, Japan

[73] Assignee: Able Co., Ltd., Saitama-ken, Japan

[21] Appl. No.: 631,038

[22] Filed: Apr. 12, 1996

Related U.S. Application Data

[63] Continuation of Ser. No. 326,000, Oct. 19, 1994, abandoned.

[30] Foreign Application Priority Data

Sep. 14, 1994 [JP] Japan ............... 6-219757

[51] Int. Cl.$^6$ ............... C02F 3/06; C02F 3/08
[52] U.S. Cl. ............... 210/150; 210/619; 261/92
[58] Field of Search ............... 210/150, 151, 210/333.01, 393, 410, 411, 413, 619; 261/92

[56] References Cited

U.S. PATENT DOCUMENTS

| | | | |
|---|---|---|---|
| 3,469,703 | 9/1969 | Parmentier | 210/393 |
| 3,891,551 | 6/1975 | Tiedemann | 210/410 |
| 4,085,051 | 4/1978 | Kaminsky et al. | 210/333.01 |
| 4,422,930 | 12/1983 | Hatakawa | 210/150 |
| 4,956,082 | 9/1990 | Choi | 210/619 |
| 5,356,541 | 10/1994 | Wickzell | 210/411 |
| 5,374,360 | 12/1994 | Weis | 210/333.01 |

FOREIGN PATENT DOCUMENTS

| | | | |
|---|---|---|---|
| 2227188 | 9/1990 | Japan | 210/150 |

*Primary Examiner*—Peter A. Hruskoci
*Assistant Examiner*—Theodore M. Green
*Attorney, Agent, or Firm*—McAulay Fisher Nissen Goldberg & Kiel, LLP

[57] ABSTRACT

An apparatus for aerobic biological treatment of waste water, in which a great number of carrier members having a large surface area to which microorganisms adhere are movably set in a cylindrical reactor within a given range of height, and the carrier is horizontally moved substantially continuously so that a part of the carrier is cleaned with cleaning air. The partial cleaning system eliminates the disadvantages associated with intermittent cleaning of the whole carrier.

2 Claims, 4 Drawing Sheets

APPARATUS FOR AEROBIC TREATMENT OF WASTE WATER

This is a continuation of application Ser. No. 08/326,000 filed Oct. 19, 1994, abandoned.

FIELD OF THE INVENTION

This invention relates to an apparatus for waste water treatment using aerobic microorganisms and more particularly to an apparatus for waste water treatment using an organic membrane of aerobic microorganisms immobilized on a solid carrier.

BACKGROUND OF THE INVENTION

Waste water treatment using aerobes is advantageous in that the apparatus for retaining microorganisms within a reactor is less restricted in designing as compared with treatment using anaerobes; for aerobes are more proliferative than anaerobes. Waste water treatment using aerobes is roughly divided into a suspension system using microorganisms suspended in waste water and an organic membrane system using microorganisms immobilized on a solid carrier. While various methods and apparatus for these systems have been proposed to date, the suspension system involves a problem that the floc of microorganisms has a low sedimentation rate and sometimes overflows the apparatus, failing to secure a requisite amount of the microorganisms (called a bulking phenomenon), which leads to reduction in treated water quality. To the contrary, the organic membrane system is free from such a problem and also achieves high efficiency in waste water treatment. From this standpoint, the latter system tends to be adopted in preference to the former system.

In spite of the above advantages, the organic membrane system essentially requires an intermittent cleaning operation to prevent clogging of the reactor with the proliferating microorganisms. To this effect, the treatment must be suspended to clean the reactor by air jetted from a cleaning pipe provided beneath the bottom of the reactor. However, some kinds of carriers or some structures for holding the carrier make it difficult to conduct cleaning properly while securing a sufficient effective surface area of the carrier.

In more detail, in a system in which spherical or irregular-shaped inorganic molded or natural fillers as a carrier are merely packed in a reactor, the fillers contact to each other only to provide a small effective surface area, and with small spaces among themselves, they are liable to be clogged. In a system in which a cylindrical carrier holder having a large surface area, such as a honeycomb structure, is placed in a reactor, the effective surface area decreases as the microorganisms proliferate on the inner surface of the structure, and the structure is not easy to clean. In a system in which a fibrous or ribbon-shaped metallic or plastic material is supported by a column or a cage, interstices among fibers or ribbons, where densely entangled, are soon filled with the microorganisms, resulting in considerable reduction in effective surface area. Additionally, if this system is cleaned vigorously, the microorganisms fall off the carrier excessively to markedly reduce the treating capacity after the cleaning operation, failing to continue the treatment in a stable manner.

The intermittent cleaning is also accompanied by a serious disadvantage that the cleaning pipe is easily clogged during the treatment. Further, the air jetted from the cleaning pipe usually goes up almost vertically. In a common reactor whose height is about 4 to 5 m, the air flow diffuses to a diameter of about 30 cm at the most. Accordingly, in order to apply the air jet flow to every part of the carrier, it is necessary to densely provide a large number of nozzles for spouting air. This not only incurs increased initial cost and operating cost but makes operation control difficult.

SUMMARY OF THE INVENTION

The present inventors have conducted extensive investigations to solve the problems associated with conventional organic membrane type apparatus for biological waste water treatment using aerobes. They found as a result an epoch-making apparatus, in which a cleaning system entirely different from the conventional one is adopted so that proper cleaning can be carried out without causing a great reduction in treating capacity while retaining a sufficient effective surface area and, in addition, it is not necessary to suspend the treatment for every cleaning operation.

As mentioned above, in the conventional organic membrane type treating apparatus, microorganisms are made to grow on the surface of a carrier fixed to the reactor (or substantially fixed to the reactor via a cage, etc.), and the whole fixed carrier is cleaned by air jetted from a cleaning pipe provided beneath the bottom of the reactor (hereinafter referred to as a whole cleaning system). It means that the whole membrane of the microorganisms on the carrier surface undergoes change in amount all at once. If the cleaning operation causes separation of an excessively large quantity of the microorganisms, this leads to a great reduction in treating capacity.

The inventors paid their attention to the possibility that replacement of the whole cleaning system with a succession of partial cleaning steps would solve the above-mentioned problems. For example, if the carrier is turned horizontally on its vertical axis so that only a part thereof may be subjected to cleaning successively (hereinafter referred to as a partial cleaning system), one turn completes one cycle of cleaning of the whole carrier. Assuming one rotation of the carrier is made in 1 hour, the part cleaned for 1 minute is a sector having a central angle of 360°/60=60°. Even if the microorganisms excessively fall off the carrier in one sector, the influence on the treating capacity would be confined to $\frac{1}{60}$ of the whole system. Therefore, the partial cleaning system is easy to carry out while minimizing the adverse influences on the treating capacity even if the carrier is such that the microorganisms tend to fall off excessively.

Further, according to the partial cleaning system, cleaning air is jetted within a so limited area of the whole carrier that the density of the jet nozzles may easily be increased, and the occurrence of clogging of the cleaning pipe can be reduced because air is continuously spouted therefrom.

The present invention has been completed based on the above-described idea. An object of the present invention is to provide a novel apparatus for aerobic biological waste water treatment in which cleaning is partially and successively conducted by moving the part to be cleaned so that the treating capacity can be stabilized under little influence of the degree of cleaning.

Another object of the present invention is to provide a novel apparatus for aerobic biological waste water treatment in which the above-described partial cleaning system is adopted so as to minimize the influence of cleaning, thus making it possible to choose a carrier designed to have a large effective surface area with priority to other properties even if the carrier has been hardly applied because of difficulty in conducting proper cleaning or even if the carrier tends to cause excessive fall-off of the microorganisms.

A further object of the present invention is to provide a novel apparatus for aerobic biological waste water treatment in which the above-described partial cleaning system is adopted so that the biological treatment can be performed in a continuous system without being suspended for cleaning.

A still further object of the present invention is to provide a novel apparatus for aerobic biological waste water treatment in which the above-described partial cleaning can be carried out efficiently by selecting a carrier suitable for partial cleaning.

A yet further object of the present invention is to provide a novel apparatus for aerobic biological waste water treatment in which a cleaning means for partial cleaning and an air diffusing means are separately provided so as to separately obtain a shearing force necessary for cleaning (separation of the microorganisms) and enough supply of dissolved oxygen necessary for maintaining an aerobic atmosphere.

The above objects of the present invention are accomplished by an apparatus for aerobic biological treatment comprising a reactor having a prescribed height, a means for feeding waste water to be treated to the reactor, a means for discharging treated water, a carrier holder for holding a carrier to which microorganisms easily adhere in such a manner that the carrier occupies approximately the entire plane within a given range of height of the reactor except the inner peripheral portion and the central portion of the reactor, a means for moving the carrier holder substantially continuously at a slow speed along a given track of rotation, an air jetting means for jetting cleaning air for separating the microorganisms adhered to the carrier, the air jetting means being fixed beneath the carrier at a position along the track of rotation and linearly extending in the radial direction nearly perpendicular to the track, and an air diffusing means for supplying air to maintain the waste water to be treated in an aerobic atmosphere, the air diffusing means being provided at the inner peripheral portion and/or the central portion of the reactor.

DETAILED DESCRIPTION OF THE INVENTION

The reactor which can be used in the apparatus of the present invention is not particularly limited in shape and may have a circular, elliptical or rectangular transverse section, but, in general, an open top cylindrical reactor is preferably used.

The waste water feeding means includes a means for feeding waste water directly to the reactor and a means having a controlling tank for maintaining the feed rate constant, from which a constant amount of water is continuously fed to the upper part of the reactor by means of a feed pump.

The treated water discharging means is appropriately selected from, for example, an overflow system in which treated water overflows the weir provided at the upper part of the reactor and a system using an overflow pipe rising from the lower part of the reactor up to the water level of the reactor.

The carrier to which microorganisms adhere preferably includes a brush-like member made of fibrous material, fitted to a vertical frame of a supporting frame skeleton. The term "brush-like" as used herein means a structure comprising a large number of fibrous members having, for example, a diameter of 0.5 to 5 mm and a length of about 10 to 100 mm, radially implanted in the vertical frame as a core. The fibrous members preferably include those prepared from non-water-absorbent and biodegradation-resistant materials which are hardly decomposed by the microorganisms in the reactor, such as plastic fibers, e.g., polypropylene. It is more preferable to use crimped fibers or fibers having an irregular section, such as a cross, so as to improve adhesion of microorganisms. Flexible fibrous members which can change their form with water flow may be used. The carrier to be used in the present invention is not limited to the above-mentioned fibrous members, and any other materials that can be cleaned with ease and have a large effective surface area for microorganism adhesion may be employed. For example, useful carriers include regular- or irregular-shaped inorganic substances, either molded or as naturally occurring, and metallic or plastic yarn or ribbon made into a structure other than a brush, for example, a hank around at least two vertical frames. Since the carrier is to be moved in the reactor, it preferably has a specific gravity of around 1 or less for power saving.

The carrier holder is not particularly limited in structure as long as it is movable in the reactor to move the carrier. The holders include a supporting frame skeleton having supporting frames in which or around which the aforesaid fibrous member can be implanted or wound, and a cage in which small blocks of a carrier are packed and held. A typical example of the holder is a supporting frame skeleton or cage rotatable on its vertical axis provided at the center of an open top vertical cylindrical reactor. More specifically, a preferred holder is composed of a parallel pair of horizontal supporting members and a plurality of vertical members connecting the pair of horizontal supporting members, in which a number of fibrous members made of, e.g., crimped plastic fiber are each fitted to each of the vertical members in a radial manner with the vertical member as a core. The horizontal supporting members are composed of structural materials having a prescribed strength, such as metallic or plastic pipes, bars or plates. While these materials may also be used as the vertical member, the vertical member is preferably wire or a twisted strand strung between the upper and lower horizontal members with appropriate tension for serving as cores for the fibrous members.

The means for moving the carrier holder preferably includes a combination of a ring guide rail provided on the inner wall of the reactor and a plurality of rollers fitted to the periphery of the carrier holder. The rotary movement of the carrier holder can be guided by the rollers rolling on the ring guide rail. The carrier holder can be moved slowly by a driving motor via a speed reducer. As previously referred to, the track of the moving holder is not limited to a true circle and may be an ellipse, etc. In this case, a supporting frame skeleton or a supporting cage can be moved using a chain sprocket.

The cleaning air letting means which is fixed on the bottom of the reactor should extend over substantially the whole radius of the carrier in the direction perpendicular to the track of the moving carrier. In the case where a carrier holder is rotated in a cylindrical reactor, for example, a cleaning pipe having a plurality of nozzles is laid on the bottom of the reactor from the inner wall to the center of the reactor. In order to prevent clogging of the pipe with sediment, the nozzles are preferably provided to face downward.

In order to maintain the treating system in an average aerobic atmosphere, a plurality of air diffusing means are provided below the horizontal track of the moving carrier in such a manner that the air from the plural diffusing means may not flow against each other. Where a carrier is rotated in a cylindrical reactor, for example, the diffusing means are preferably provided in such a manner as to form circulating water flows consisting of upward flows along the inner wall of the reactor and downward flows passing through the moving carrier holder. The plural diffusing means are preferably set along the inner wall of the reactor in the peripheral direction at regular intervals. If desired, an air diffusing means may also be provided at the central portion of the reactor. The diffusing means to be provided at the central portion includes, for example, a vertical hollow cylindrical column having an opening near the bottom and beneath the water level, and an air diffuser set near the inside bottom of the column, from which air is jetted to cause an upward flow (air lift type). The hollow cylindrical column may be composed of a fixed lower column and a rotatable upper column held thereon with bearings so that the rotating upper column may serve as a pivot for rotating the carrier holder. The air diffusing means thus provided produce upward air flows at both the center and the inner periphery of the reactor which then turn downward flows passing through the inside of the carrier, making as a whole a water flow circulating in the whole system.

The air diffusing means may have any known structure. Since, in the present invention, jetting of air for cleaning and diffusion of air for maintenance of an aerobic atmosphere are effected by separately provided means, it is possible to select any structure for each means suited to the respective function. That is, a cleaning air jetting means is exclusively for separation of the microorganisms adhered to the carrier and is therefore required to spout big air bubbles to produce a sufficient shearing force (air lifting force). On the other hand, an air diffusing means is exclusively for supplying sufficient dissolved oxygen to the water to be treated and is therefore required to produce as fine air bubbles as possible to accelerate dissolving of air. Such fine air bubbles can be obtained by, for example, putting a net above the nozzles of the air diffusing pipe.

The movement of the movable carrier holder may be continuous or substantially continuous. The term "substantially continuous" means the movement is intermittent at a prescribed time interval at a small central angle. For example, in the case where a carrier holder is rotated in a cylindrical reactor by intermittently moving at 1 or 2 minutes intervals to make one rotation per hour, i.e., making an angle of 6° or 12°, respectively, for every movement, the partial cleaning is performed substantially continuously. Further, air jetting for cleaning may be effected either continuously or intermittently depending on the degree of fall-off of the microorganisms. In any of these embodiments of partial cleaning, the biological treatment can be achieved while cleaning a part of the carrier with the rest of the microorganisms-on-carrier keeps on working on biological treatment.

The moving speed of the movable carrier holder generally ranges from 0.05 to 1.5 rotations, preferably from 0.1 to 1 rotation, per day, while varying depending on the treating capacity or the size of the apparatus.

While the apparatus of the present invention has been explained with reference to the structure in which a carrier itself is moved (hereinafter referred to as a first embodiment), the partial cleaning may also be achieved by a second embodiment in which a cleaning pipe is revolved while the carrier being fixed in the reactor (hereinafter referred to as a revolving cleaning pipe system). The revolving cleaning pipe system is recommended for a large-sized treating apparatus with an increased weight of the carrier holder.

According to the second embodiment adopting the revolving cleaning pipe system, the apparatus of the present invention comprises a reactor having a prescribed height, a waste water feeding means for feeding waste water to be treated to the reactor, a treated water discharging means for discharging treated water from the reactor, a fixed carrier holder for holding a carrier to which microorganisms easily adhere in such a manner that the carrier is arranged in a ring to occupy approximately the entire plane within a given range of height of the reactor except the inner peripheral portion and the central portion of the reactor, an air letting means for jetting cleaning air from below the carrier for separating the microorganisms adhered to the carrier, the air jetting means linearly extending in the radial direction of the ring of the carrier and being movable substantially continuously at a slow speed in the peripheral direction of the ring of the carrier, and an air diffusing means for supplying air from the inner peripheral portion and/or the central portion of the reactor to maintain the waste water to be treated in an aerobic atmosphere.

The second embodiment is characterized in that the carrier holder is fixed in the reactor and that the cleaning pipe is moved on a ring track. The other members may be the same as those described with respect to the first embodiment.

The first embodiment is suitable for a small-sized apparatus because the cleaning pipe is fixed so that such disorders as air leak can be prevented easily. On the other hand, the second embodiment is suitable for a large-sized apparatus because a heavy carrier is fixed so that the driving mechanism does not need to be large-sized.

According to the present invention, the carrier can be subjected to partial cleaning in a substantially continuous manner by moving either one of the carrier and the cleaning pipe so as to clean a limited portion of the movable or fixed carrier. While the limited portion of the carrier is being cleaned, the other portion of the carrier continues the biological treatment by the action of the aerobic microorganisms adhered thereto.

The cleaning means is capable of providing a proper shearing force to function as an exclusive means for separating the microorganisms from a limited area of the carrier, while the air diffusing means is capable of feeding fine air bubbles as an exclusive means for supplying sufficient amount of dissolved oxygen to the water to be treated.

The present invention will be illustrated in greater detail based on a specific example of the apparatus by referring to the accompanying drawings and test examples using the apparatus, but it should be understood that the present invention is not construed as being limited thereto.

Figure 1:
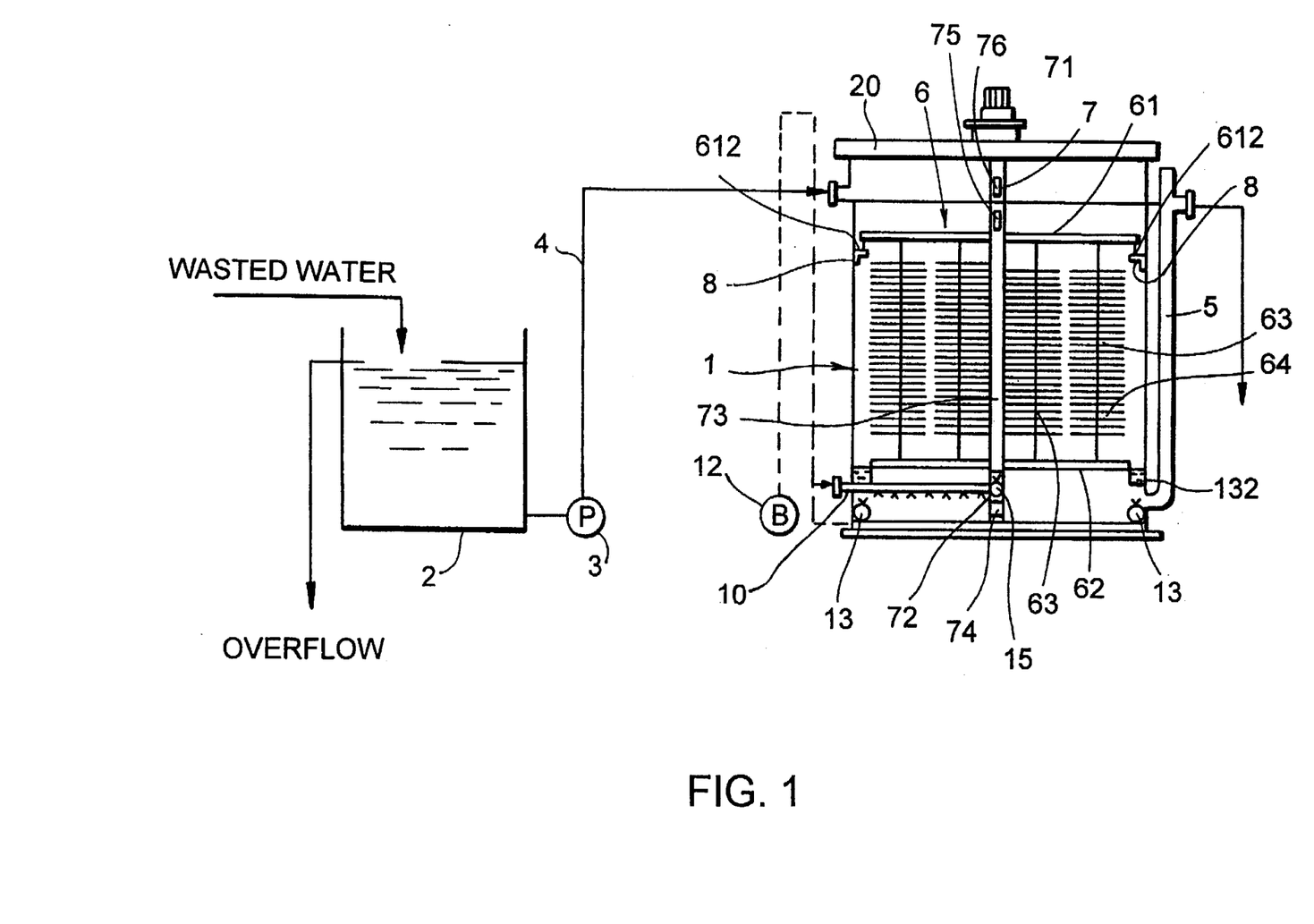
FIG. 1 is a schematic illustration of one embodiment of the treating apparatus according to the present invention.

FIG. 1 is a schematic longitudinal cross section of a typical apparatus according to the present invention. Waste water is once put into controlling tank 2 and overflows to keep a constant volume. The waste water is fed from controlling tank 2 to the upper part of open top cylindrical reactor 1 via feed pipe 4 at a constant flow rate by means of feed pump 3.

Discharge pipe 5 rises from the lower part of reactor 1 up to the water level to discharge treated water by an overflow.

Numeral 6 indicates a movable carrier holder, the detailed structure of which will be described later. Column 7 rises from the center bottom of reactor 1 until it projects above the upper part of reactor 1. Column 7 is a hollow cylinder composed of lower fixed column 72 on which upper revolving column 73 is supported through bearings. Fixed column 72 has opening 74 near the bottom thereof for letting water in and opening 75 below the water level for letting water out. Numeral 76 is an air vent. To revolving column 73 are fixed a pair of horizontal supporting members 61 and 62 (inclusively expressed by numeral 6) so that the upper and lower members integrally rotate on shaft 7 driven by driving motor 71. Drive shaft 7 is steadily held by reinforcing member 20 provided at the top of reactor 1.

Figure 3:
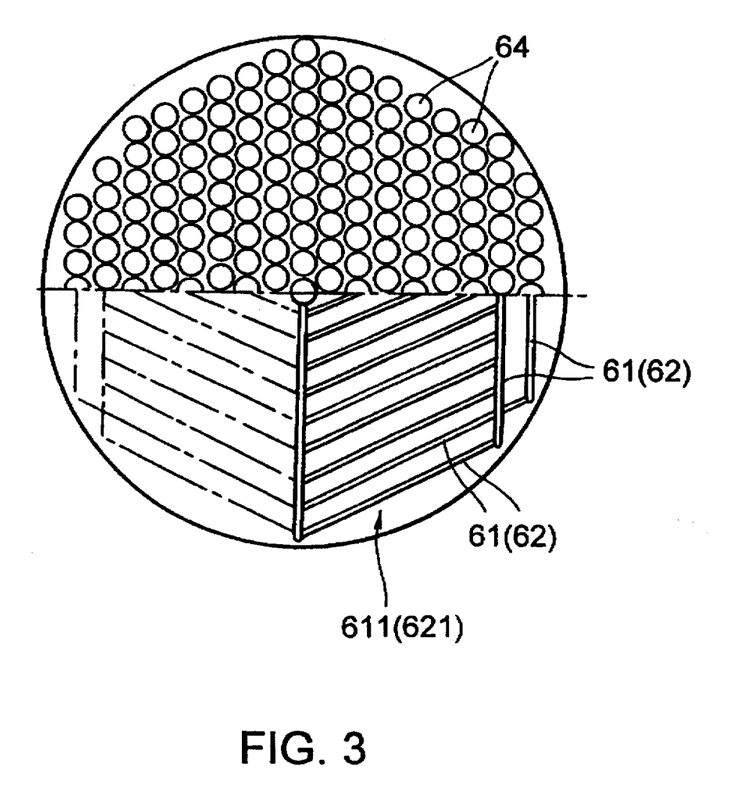
FIG. 3 is a plane view illustrating the structure of a movable carrier holder of the treating apparatus shown in FIG. 1, the upper half of which shows the state with brush-like fibrous members being fitted thereto, and the lower half of which shows supporting frames.
Figure 4:
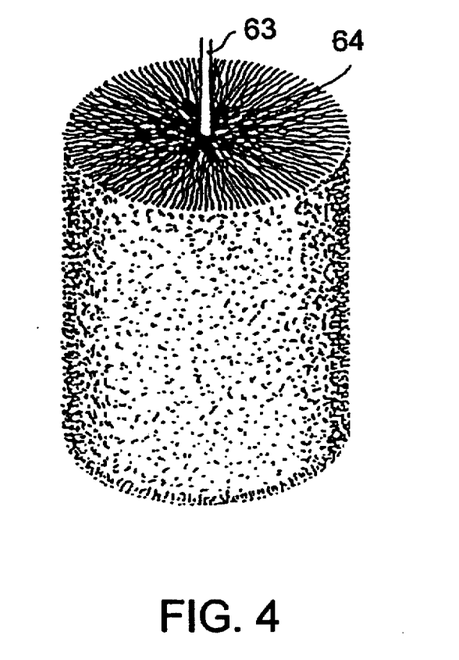
FIG. 4 is a perspective view of a single vertical member fitted with a brush-like fibrous member.

As shown in the lower half of FIG. 3, movable carrier holder 6 comprises a number of upper horizontal supporting members 61 linked together to form an approximately hexagonal upper frame 611 and a number of lower horizontal supporting members 62 linked together to form lower frame 621 having the same frame structure as upper frame 611. Upper and lower frames 611 and 621 are parallel to each other and fixed to upper column 73 so as to rotate in one body. Upper and lower frames 611 and 621 provide a number of pairs of supports for vertical members 63 at regular intervals omnidirectionally. A plurality of vertical members 63, in each of which fibrous members 64 are radially implanted to form a brush shape as shown in FIG. 4, are vertically set between each pair of supports of upper frame 611 and lower frame 621. Fibrous members 64, when soaked in water in a natural state, expand radially with vertical member 63 as a core. The side view of the brush-like fibrous members is shown in FIG. 1, the plain view in the upper half of FIG. 3, and a perspective view of a single member in FIG. 4. Note that these figures are schematic for the sake of convenience. In using a relatively long fibrous material for making brush-like fibrous members 64, the carrier may comprise only 1 or 2 vertical members 63 each fitted with brush-like fibrous member 64 in the radial direction of reactor 1 as shown in FIG. 1, or in using a relatively short fibrous material for making brush-like member 64, a larger number of vertical members 64 each fitted with brush-like fibrous member 64 may be arranged in the radial direction of reactor 1 as shown in the upper half of FIG. 3. In any case, it is preferable to arrange brush-like fibrous members 64 with little gap among them except for the portion near the inner wall of reactor 1.

As shown in FIG. 4, brush-like fibrous member 64 used in this example comprises crimped polypropylene fibers, implanted a into plastic rod as vertical member 63 to form a brush shape.

Endless guide rail 8 is provided on the upper inner wall of reactor 1, and rollers 612 fitted to the periphery of upper frame 611 of movable carrier holder 6 at appropriate intervals are on guide rail 8. Thus, carrier holder 6 can be moved smoothly and, at the same time, the mechanical strength requirement for the upper supporting members 61 can be relaxed. For the purpose of relaxation of that requirement, lower horizontal supporting members 62 may be suspended by upper horizontal supporting members 61 via vertical members 63. It is also possible to removably fit vertical members 63 between the upper and lower supports.

Figure 2:
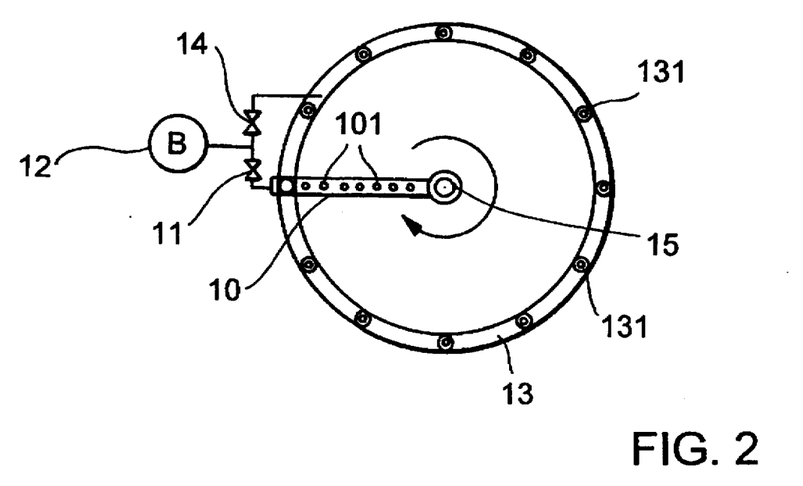
FIG. 2 is a plane view of the bottom of a reactor of the treating apparatus shown in FIG. 1.

Numeral 10 is a cleaning air letting pipe. In this example, it is a straight pipe provided near the bottom of reactor 1, extending from the center of reactor 1 in the radial direction to the outside of reactor 1. The outside end of cleaning air jetting pipe 10 is connected to blower 12 via throttle valve 11. Cleaning air jetting pipe 10 has a number of air jetting nozzles 101 on the upper lower side thereof to continuously jet cleaning air which rises upward against movable carrier holder 6.

Figure 5:
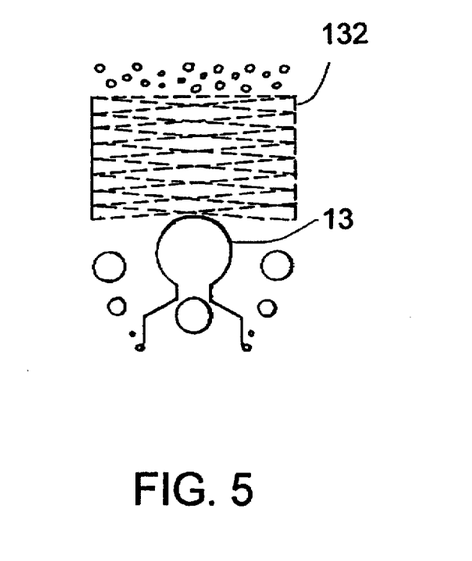
FIG. 5 is an enlarged view of air diffusion mechanism by the air diffusing means.

Air diffusing ring pipe 13 having a plurality of air jetting nozzles 131 at a prescribed interval is provided near the bottom of reactor 1 along the inner wall of reactor 1. As shown in FIG. 5, each air diffusing site is composed of an air jetting nozzle facing downward and a means for making air bubble finer (hereinafter called a fine bubbler) 132 provided in the course of rising air bubbles. While passing through fine bubbler 132, air bubbles are made finer to increase the efficiency of oxygen dissolving in water. Air diffusing pipe 15 is placed inside lower column 72, the fixed part of column 7, to generate an upward flow from inlet opening 74 toward outlet opening 75. These air diffusing pipes 13 and 15 are connected to blower 12 via throttle valve 14.

TEST EXAMPLE 1

Waste water from dairying, the quality of which is shown in Table 1 below, was biologically treated using an apparatus shown in FIG. 1 as per the following specifications under the following conditions.

Reactor 1: SUS 304-made cylindrical tank; diameter: 1 m; height: 2.5 m; effective water depth: 2.0 m; capacity: 1.57 m$^3$ Carrier 64: Brush-like carrier made of polypropylene yarn of 1.2 mm in diameter and 450 mm in unit length; position: 300 mm to 1800 mm from the bottom of reactor 1; total carrier volume: 1.2 m$^3$; packing: 75%

Carrier holder 6 was rotated at a speed of one rotation per 5 days by driving motor 71 combined with a speed reducer. To reactor 1 were continuously fed 9 m$^3$/day of the waste water, and 0.1 Nm$^3$/min of cleaning air from cleaning pipe 10, and 0.14 Nm$^3$/min of air from air diffusing pipes 13 and 15 (total rate of air blowing: LV=18 m$^3$/n$^2$·hr) over a period of 4 months. As a post-treatment, the water withdrawn from the reactor was subjected to sedimentation in a settling tank in the presence or absence of an aluminum type coagulant (PAC) in a usual manner. The quality of treated water as measured when a steady state was reached are shown in Table 1. At the start of the treatment, seed sludge was not supplied. It took about 1.5 months for the quality of treated water to become constant. In Table 1, "water after sedimentation" is the water obtained by the post-treatment in the absence of a coagulant, and "supernatant water" is the water obtained by the post-treatment in the presence of 100 mg/l of PAC.

TABLE 1

| Measurement Item | Waste Water | Treated Water | Water After Sedimentation | Supernatant Water* |
|---|---|---|---|---|
| BOD (mg/l) | 870 (540–1120) | 156 (50–210) | 121 (63–143) | 26 |
| COD (mg/l) | 614 (280–840) | 64 (38–84) | 51 (30–68) | 19 |
| Suspended solid (mg/l) | 215 (80–340) | 140 (35–164) | 68 (50–84) | 6 |
| N-HEX (mg/l) | 110 (30–180) | 28 (8–32) | 21 (14–23) | 4 |
| pH | 7–11.5 (adjusted to pH 7) | 7.2 (7.1–7.3) | 7.1–7.4 | 7.1 |
| Temperature (°C.) | 28 (26–33) | 23–28 | — | — |
| Dissolved Oxygen (mg/l) | — | 4 (3–6) (in biological treatment tank) | — | — |

Note:
*PAC: 400 mg/l

It is seen from Table 1 that, despite such a high BOD volume load of 4.7 kg/m, the BOD of the waste water, 870 μg/l in average, was reduced to 121 μg/l (after sedimentation), achieving as high a reduction as 86%.

TEST EXAMPLE 2

In order to confirm the effects of the partial cleaning system according to the present invention, waste water from a delicatessen factory (average BOD: 840 mg/l) was treated in the same apparatus as used in Test Example 1 under the following conditions.

Figure 6:
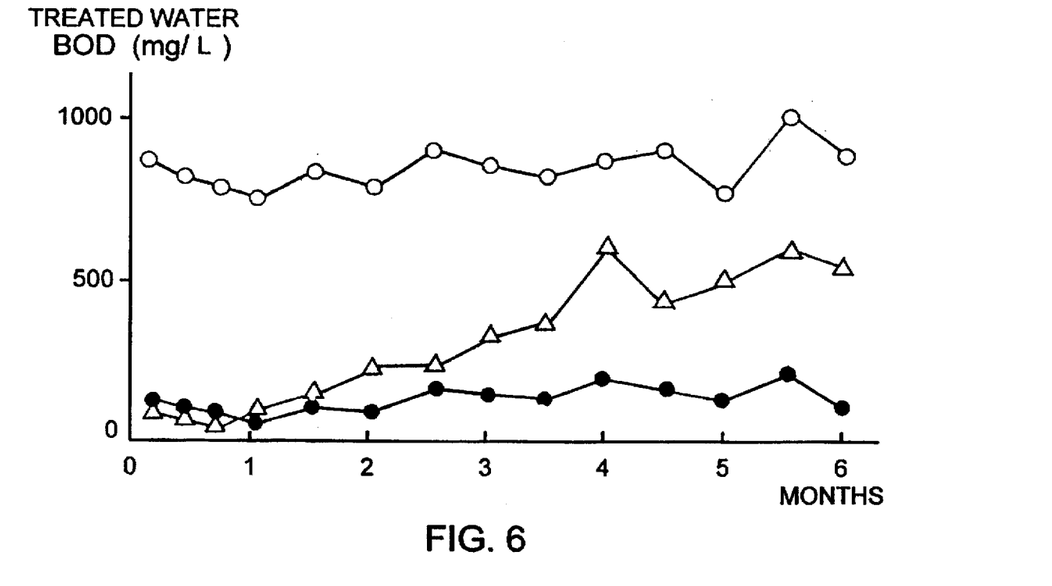
FIG. 6 shows changes in BOD of waste water under experimental treatment for evaluating the effects of partial cleaning.

BOD volume load: 3 kg/m
Total rate of air blowing (LV): 13 m$^3$/n$^2$·hr
Cleaning air: 0.1 Nm$^3$/min
Diffused air: 0.14 Nm$^3$/min In FIG. 6 is shown BOD change of the treated water, marked with bullets (●). The line marked with hollow bullets (o) indicate BOD of the waste water to be treated.

For comparison, the treatment was conducted in the same manner, except that cleaning with air from cleaning air jetting pipe 10 was not conducted and, after 6 months' continuation of the treatment, the carrier was cleaned all over by means of a cleaning air jetting means (not shown) provided on the entire bottom area of reactor 1. The change in BOD of the treated water is also shown in FIG. 6 with triangles (Δ).

These results prove that the water treatment using the partial cleaning system of the present invention provides treated water of satisfactory quality in a stable manner, whereas the conventional whole cleaning system (intermittent cleaning system) involves remarkable deterioration of water quality immediately after the intermittent cleaning operation, making the treatment capacity instable.

TEST EXAMPLE 3

Figure 7:
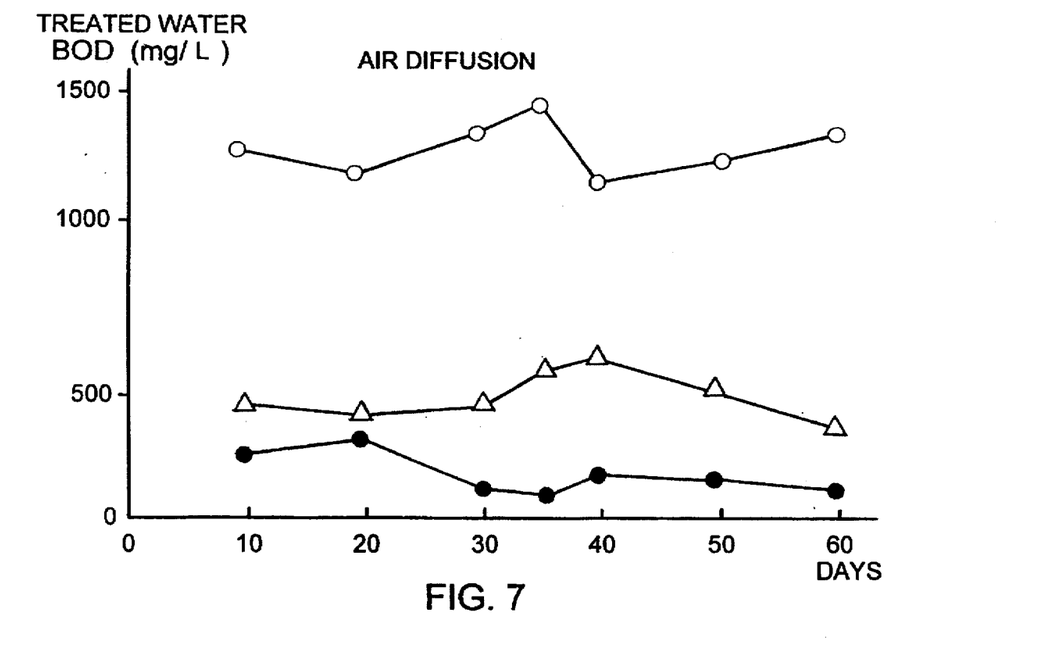
FIG. 7 shows changes in BOD of waste water under experimental treatment for evaluating the effects of air diffusion.

In order to confirm the influences of air diffusion on a movable carrier holder, waste water from a cheese factory (average BOD: 1280 mg/l) was treated in the same apparatus as used in Test Example 1 under conditions of BOD volume load of 3 kg/m and a total rate of air blowing (LV) of 14 m$^3$/n$^2$·hr. The BOD change of the treated water is shown in FIG. 7, marked with bullets. The line with hollow bullets indicate the quality of the waste water.

For comparison, the treatment was conducted in the same manner, except for feeding air only from cleaning air jetting pipe 10 while stopping air diffusion. The results obtained are also shown in FIG. 7 with a triangle mark.

It is seen from FIG. 7 that with only the air fed for cleaning, though effective to maintain a proper amount of sludge, the system becomes short of dissolved oxygen, only to provide low water quality.

According to the present invention, a part of a carrier is cleaned by moving either one of a carrier and a carrier cleaning means substantially continuously during the biological treatment. Therefore, even if cleaning of that part of the carrier may be excessive, this does not lead to a great reduction in the total treating capacity, and the treatment can be continued with stabilized treating capacity with time. A conventional cleaning system, in which the whole carrier is cleaned intermittently, tends to allow water containing sludge to flow in reverse into a cleaning pipe to cause clogging of the cleaning pipe. Such a fear of clogging is eliminated by the partial cleaning system since cleaning air is jetted from the cleaning pipe substantially continuously.

These effects make a choice of a carrier wider. For example, a carrier designed to have a large effective surface area with priority to other properties may be chosen even if it has been of hard use due to difficulty in conducting proper cleaning.

The partial cleaning system makes it possible to conduct biological treatment in a continuous manner, excluding the necessity of intermittently suspending the biological treatment for cleaning the whole tank.

The system in which a carrier is moved with a cleaning pipe being fixed facilitates a countermeasure for air leakage and is particularly suitable for a small-sized apparatus. On the other hand, the system in which a cleaning pipe is moved with a carrier being fixed is suitable for a large-sized apparatus since the moving mechanism can be reduced in size.

Because the means for partial cleaning and the means for air diffusion are separately provided, a shearing force necessary for cleaning and supply of dissolved oxygen necessary for an aerobic atmosphere can be guaranteed individually.

According to the embodiment in which vertical members each fitted with a brush-like carrier comprising plastic fibers, arranged in parallel, are rotated, an extremely large quantity of microorganisms can be adhered onto the surface of the fibers while securing sufficient interstices among fibers, thus achieving satisfactory biological treatment. Therefore, treating capacity equal to that of a conventional constructive biological treatment apparatus can be obtained with a reduced size. Such a brush-like carrier has an extremely reduced weight, making the power for moving the carrier lower.

While the invention has been described in detail and with reference to specific examples thereof, it will be apparent to one skilled in the art that various changes and modifications can be made therein without departing from the spirit and scope thereof.

What is claimed is:

1. An apparatus for aerobic biological treatment comprising a reactor having a prescribed height, a waste water feeding means for feeding waste water to be treated to the reactor, a treated water discharging means for discharging treated water from the reactor, a movable carrier holder for holding a carrier to which microorganisms easily adhere in such a manner that the carrier occupies approximately the entire plane within a given range of height of said reactor except an inner peripheral portion and a central portion of said reactor, a means for moving said carrier holder substantially continuously at a slow speed along a given track of rotation, an air jetting means for jetting cleaning air substantially continuously during movement of said carrier holder by said means for moving in an aerobic biological treatment operation for separating the microorganisms adhered to the carrier, said air jetting means being fixed beneath the carrier at a position along said track of rotation and linearly extending in the radial direction nearly perpendicular to the track, and an air diffusing means for supplying air to maintain the waste water to be treated in an aerobic atmosphere, said air diffusing means being provided at the inner peripheral portion and/or the central portion of the reactor.

2. An apparatus for aerobic biological treatment as claimed in claim 1, wherein said movable carrier holder has on the periphery thereof a plurality of rollers which roll on a ring guide rail provided on the inner wall of the reactor so as to be guided for rotary movement.

* * * * *